United States Patent
Nakamura et al.

(10) Patent No.: US 9,906,085 B2
(45) Date of Patent: Feb. 27, 2018

(54) STATOR FOR ROTARY ELECTRIC MACHINE

(71) Applicant: Mitsubishi Electric Corporation, Tokyo (JP)

(72) Inventors: Masashi Nakamura, Tokyo (JP); Shogo Okamoto, Tokyo (JP); Atsushi Sakaue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 245 days.

(21) Appl. No.: 14/911,293

(22) PCT Filed: Oct. 8, 2013

(86) PCT No.: PCT/JP2013/077347
§ 371 (c)(1),
(2) Date: Feb. 10, 2016

(87) PCT Pub. No.: WO2015/052773
PCT Pub. Date: Apr. 16, 2015

(65) Prior Publication Data
US 2016/0190884 A1 Jun. 30, 2016

(51) Int. Cl.
*H02K 3/28* (2006.01)
*H02K 3/12* (2006.01)
(Continued)

(52) U.S. Cl.
CPC ............... *H02K 3/12* (2013.01); *H02K 1/12* (2013.01); *H02K 1/16* (2013.01); *H02K 3/50* (2013.01);
(Continued)

(58) Field of Classification Search
CPC .. H02K 3/00; H02K 3/12; H02K 3/18; H02K 3/28; H02K 3/30; H02K 3/50;
(Continued)

(56) References Cited

U.S. PATENT DOCUMENTS 6,373,163 B1 * 4/2002 Oohashi ............... H02K 3/12
310/184
6,661,146 B2 * 12/2003 Oohashi ............... H02K 3/28
310/179
(Continued)

FOREIGN PATENT DOCUMENTS

EP 2009768 A2 12/2008
JP 2009-131058 A 6/2009
(Continued)

OTHER PUBLICATIONS

International Search Report for PCT/JP2013/077347 dated Dec. 17, 2013.
(Continued)

*Primary Examiner* — Tran Nguyen
(74) *Attorney, Agent, or Firm* — Sughrue Mion, PLLC; Richard C. Turner (57) ABSTRACT

Small coil groups are each configured by connecting a plurality of winding bodies in series by passing crossover portions that are formed by bending first conductor terminals radially outward axially outside a coil end and joining the crossover portions to second conductor terminals that are subject to joining, the first conductor terminals that constitute first ends of the small coil group are disposed so as to be spaced apart from each other circumferentially around a radially inner side of a circular arc-shaped region that extends circumferentially around the coil end, the second conductor terminals that constitute second ends of the small coil group are arranged so as to be spaced apart from each other circumferentially around a radially outer side of the circular arc-shaped region of the coil end, and a stator winding is produced by connecting the small coil groups within the circular arc-shaped region.

4 Claims, 8 Drawing Sheets

(51) Int. Cl.
*H02K 3/50* (2006.01)
*H02K 1/12* (2006.01)
*H02K 1/16* (2006.01)
H02K 15/00 (2006.01)
H02K 15/04 (2006.01)

(52) U.S. Cl.
CPC ........... *H02K 3/28* (2013.01); *H02K 15/0081* (2013.01); *H02K 15/045* (2013.01); *H02K 2203/09* (2013.01); *H02K 2213/03* (2013.01)

(58) Field of Classification Search
CPC .... H02K 15/00; H02K 15/0081; H02K 15/02; H02K 15/04; H02K 15/045; H02K 15/06
USPC .......... 310/71, 179–180, 182, 184–185, 198, 310/201, 208
See application file for complete search history.

(56) References Cited

U.S. PATENT DOCUMENTS

| | | | | |
|---|---|---|---|---|
| 7,408,281 B2* | 8/2008 | Kinashi | ................ | H02K 21/16 310/180 |
| 7,960,878 B2* | 6/2011 | Ishizuka | ................ | H02K 3/50 310/179 |
| 8,264,115 B2* | 9/2012 | Nakamura | ............... | H02K 3/12 310/184 |
| 2008/0224560 A1* | 9/2008 | Yoshida | ................ | H02K 3/505 310/184 |
| 2011/0260570 A1* | 10/2011 | Taniguchi | ................ | H02K 3/28 310/201 |
| 2012/0019081 A1* | 1/2012 | Tamura | .................... | H02K 3/12 310/43 |
| 2012/0248922 A1* | 10/2012 | Imazawa | ................ | H02K 3/28 310/198 |

FOREIGN PATENT DOCUMENTS

| | | |
|---|---|---|
| JP | 2011-234482 A | 11/2011 |
| JP | 2012-125043 A | 6/2012 |
| JP | 2012-143019 A | 7/2012 |

OTHER PUBLICATIONS

Communication dated May 4, 2017 issued by the European Patent Office in counterpart application No. 13895357.5.

* cited by examiner

STATOR FOR ROTARY ELECTRIC MACHINE

CROSS REFERENCE TO RELATED APPLICATIONS

This application is a National Stage of International Application No. PCT/JP2013/077347 filed Oct. 8, 2013, the contents of all of which is incorporated herein by reference in its entirety.

TECHNICAL FIELD

The present invention relates to a stator for a rotary electric machine such as an electric motor or a generator, for example, and particularly relates to a connecting unit that includes busbars that are connected to phase windings of a stator winding.

BACKGROUND ART

In generators that are used in electric vehicles (EVs), plug-in electric vehicles (PEVs), etc., busbars that have large cross-sectional areas are used because large currents are passed through the stator winding. Thus, because connecting units that include the busbars are increased in size and lead to interference with the peripheral parts of an electric motor, techniques are desired in which connecting units are housed compactly in a vicinity of the electric motor.

In consideration of such conditions, attempts have been made to make connecting units compact by disposing busbars in two layers vertically so as to be zigzag or diagonal, and producing the connecting units so as to be covered integrally by an insulating member while also insulating between the individual busbars (see Patent Literature 1, for example).

CITATION LIST

Patent Literature

Patent Literature 1: Japanese Patent Laid-Open No. 2012-143019 (Gazette)

SUMMARY OF THE INVENTION

Problem to be Solved by the Invention

In Patent Literature 1, a stator winding is configured by bending coil terminals on a radially inner side of coils radially outward, leading them radially outward axially outside the coil ends, and joining them to coil terminals that are subject to joining on a radially outer side of the coils. The portions of the coil terminals on the radially inner side of the coils that are bent radially outward (crossover portions) are arranged axially outside the coil ends so as to be spaced apart from each other circumferentially.

However, in Patent Literature 1, the connecting units themselves are configured compactly, but because the connecting units are disposed axially outside the crossover portions, axial height positions of the connecting units from the coil ends are high, and one problem has been that axial dimensions of the rotary electric machine are increased.

Bending the coil terminals also gives rise to damage to insulating coatings that are coated onto the coil terminals, leading to decreases in insulation performance. Thus, in order to suppress the occurrence of damage to insulating coatings, it is necessary to make the bending radius large, increasing distances between the crossover portions and the coil ends. Thus, axial height positions of the connecting units from the coil ends are even higher, and one problem has been that axial dimensions of the rotary electric machine are further increased.

The present invention aims to solve the above problems and an object of the present invention is to provide a stator for a rotary electric machine that suppresses increases in axial dimensions by lowering axial height positions of connecting wire portions from a coil end.

Means for Solving the Problem

A stator for a rotary electric machine according to the present invention includes: an annular stator core in which slots are arranged circumferentially; and a stator winding that is mounted to the stator core. The stator winding is configured by mounting distributed winding bodies to the stator core circumferentially at a pitch of one slot so as to be equal in number to a total number of the slots, the distributed winding bodies each being produced by winding for a plurality of turns a jointless continuous conductor wire that is coated with insulation, and the winding bodies are configured such that a first conductor terminal of the conductor wire extends outward at a first axial end of the stator core from a radially innermost position inside the slots, and a second conductor terminal of the conductor wire extends outward at the first axial end of the stator core from a radially outermost position inside the slots. A plurality of small coil groups are each configured by connecting a plurality of the winding bodies in series by passing crossover portions that are formed by bending the first conductor terminals radially outward axially outside a coil end at the first axial end of the stator winding and joining the crossover portions to the second conductor terminals that are subject to joining, the first conductor terminals that constitute first ends of the small coil group are disposed so as to be spaced apart from each other circumferentially around a radially inner side of a circular arc-shaped region that extends circumferentially around the coil end, the second conductor terminals that constitute second ends of the small coil group are arranged so as to be spaced apart from each other circumferentially around a radially outer side of the circular arc-shaped region of the coil end, the crossover portions are disposed in a C shape that spans the circular arc-shaped region so as to be spaced apart from each other circumferentially axially outside the coil end, and the stator winding is produced by connecting the plurality of small coil groups within the circular arc-shaped region.

Effects of the Invention

According to the present invention, because the plurality of small coil groups are connected within the circular arc-shaped region in which the crossover portions are not present, the axial height position from the coil end of connecting wire portions that use busbars, etc., can be lowered, enabling a stator for a rotary electric machine to be achieved in which increases in axial dimensions are suppressed.

DESCRIPTION OF EMBODIMENTS

A preferred embodiment of a stator for a rotary electric machine according to the present invention will now be explained with reference to the drawings.

Embodiment 1

Figure 1:
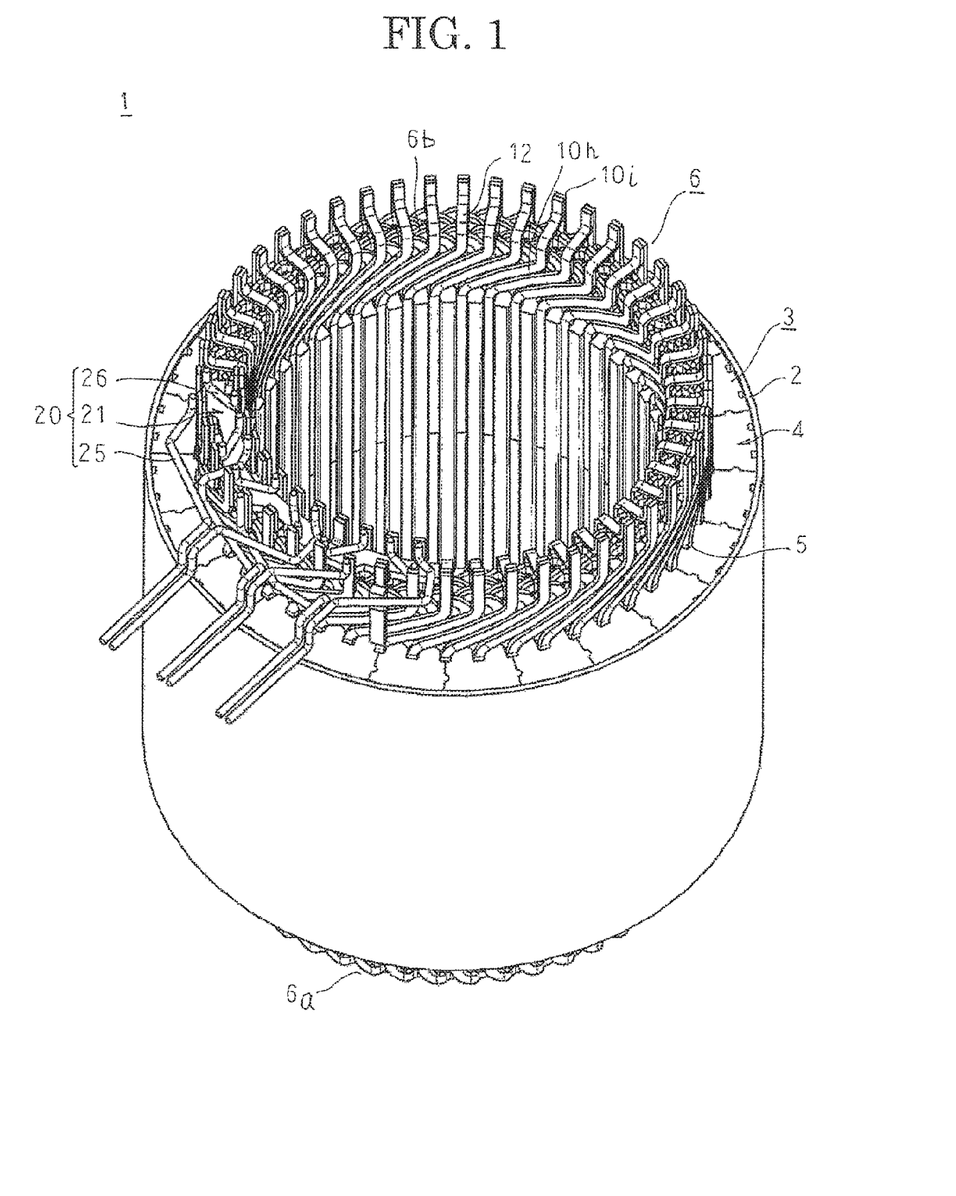
FIG. 1 is an oblique projection that shows a stator for a rotary electric machine according to Embodiment 1 of the present invention.
Figure 2:
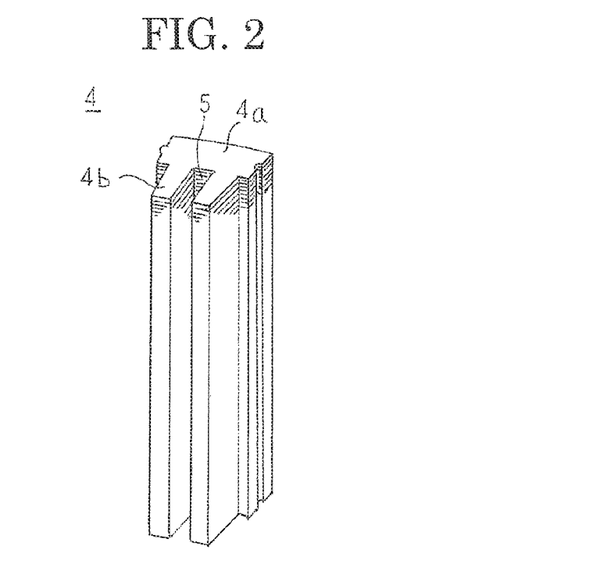
FIG. 2 is an oblique projection that shows a core block that constitutes part of a stator core in the stator for a rotary electric machine according to Embodiment 1.
Figure 3:
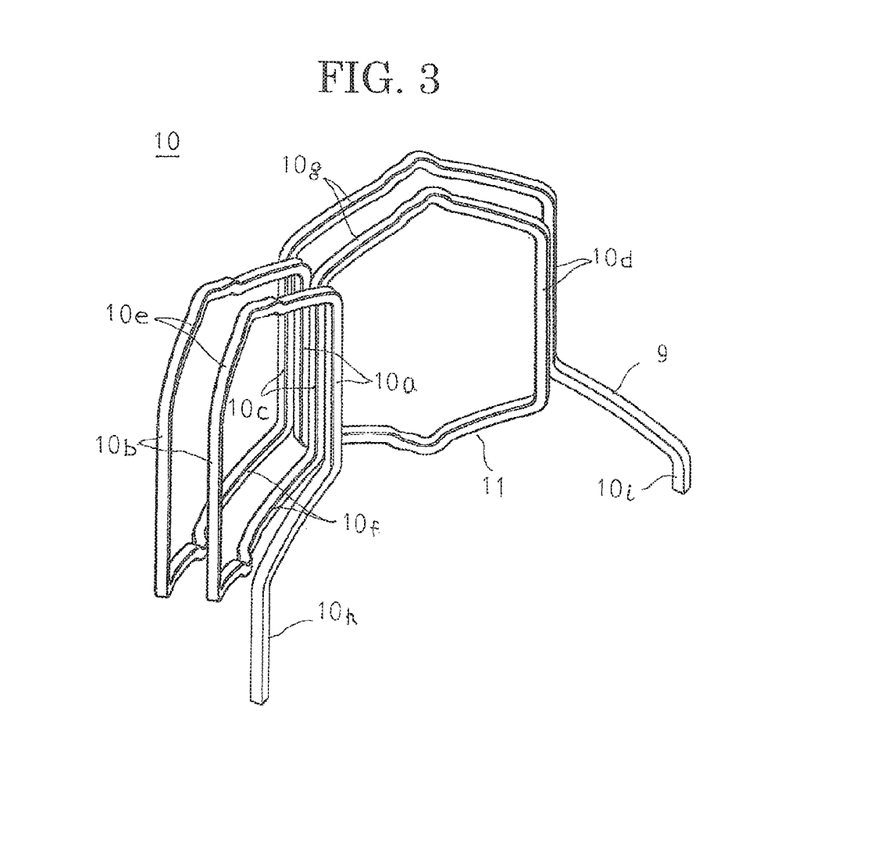
FIG. 3 is an oblique projection that shows a winding body that constitutes part of a stator winding in the stator for a rotary electric machine according to Embodiment 1.
Figure 4:
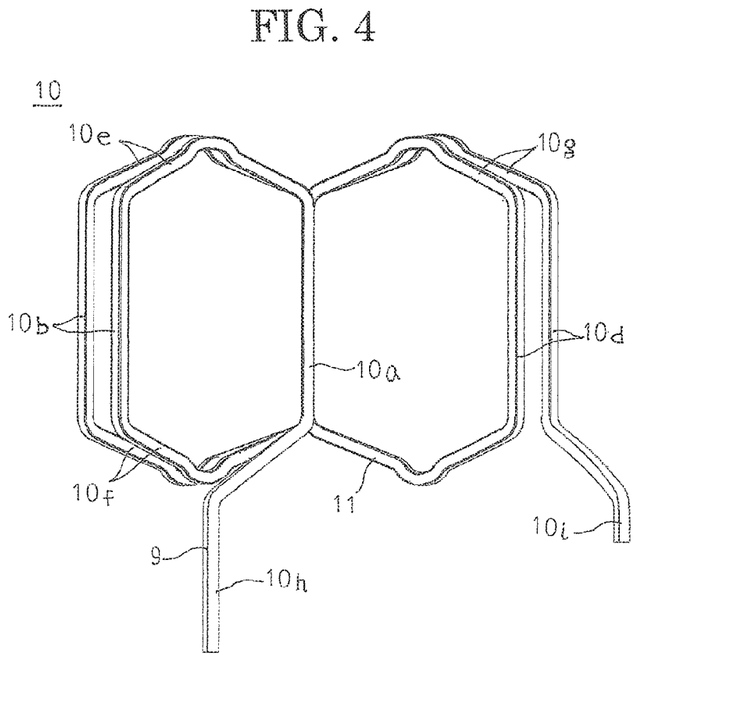
FIG. 4 is a front elevation that shows the winding body that constitutes part of the stator winding in the stator for a rotary electric machine according to Embodiment 1.
Figure 5:
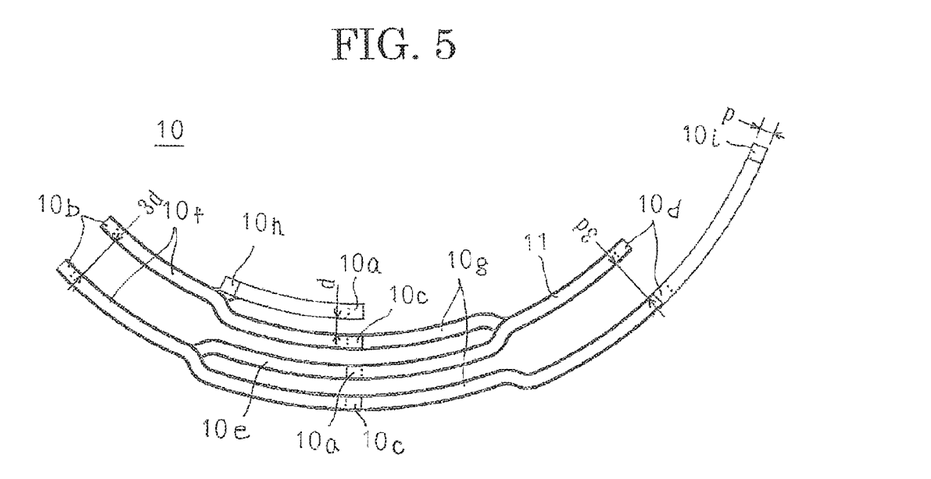
FIG. 5 is an end elevation that shows the winding body that constitutes part of the stator winding in the stator for a rotary electric machine according to Embodiment 1 viewed from a side near second coil ends.
Figure 6:
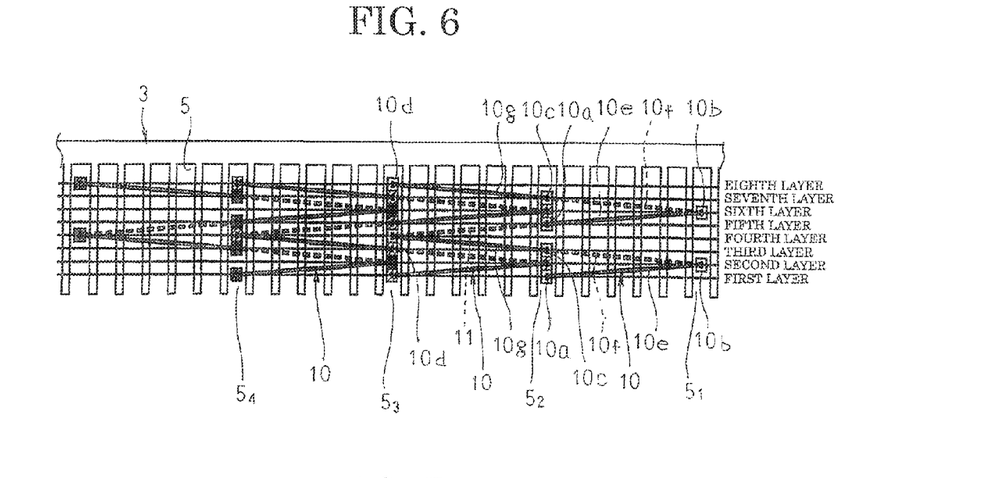
FIG. 6 is a partial end elevation that shows a state in which three winding bodies that constitute part of the stator winding in the stator for a rotary electric machine according to Embodiment 1 are mounted into the stator core so as to share a single slot viewed from a side near second coil ends.
Figure 7:
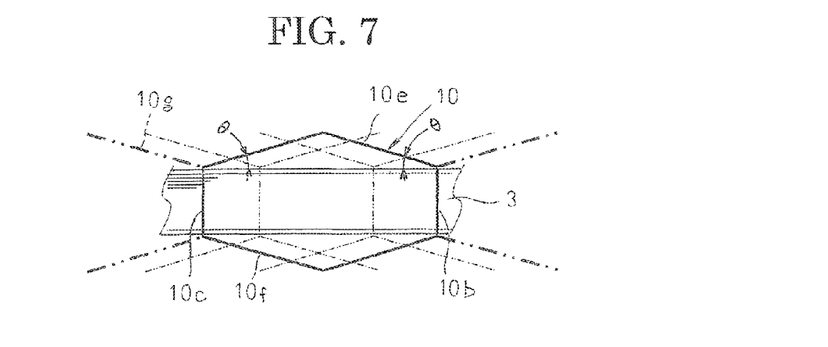
FIG. 7 is a developed projection that shows a winding body that is mounted onto the stator core in the stator for a rotary electric machine according to Embodiment 1 viewed from radially outside.
Figure 8:
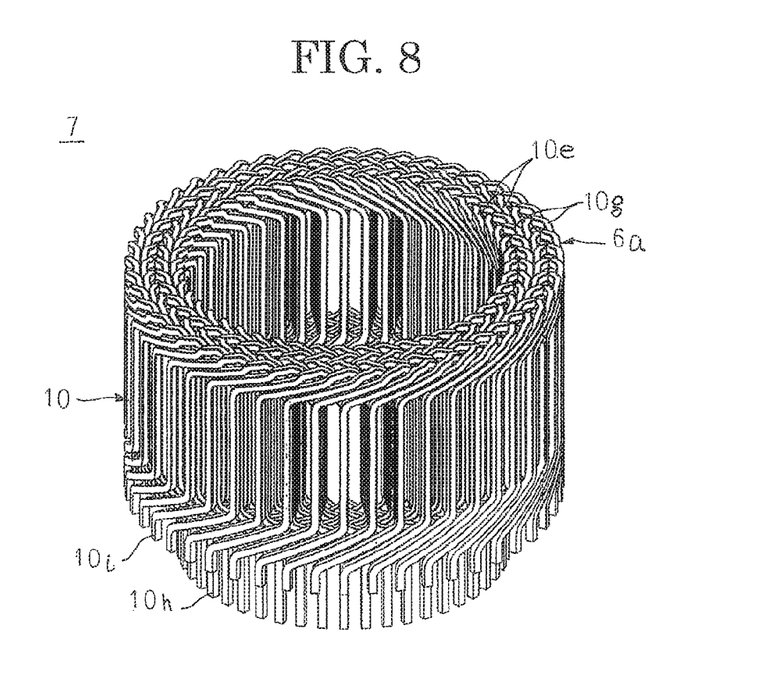
FIG. 8 is an oblique projection that shows a winding assembly that constitutes a stator winding in the stator for a rotary electric machine according to Embodiment 1.
Figure 9:
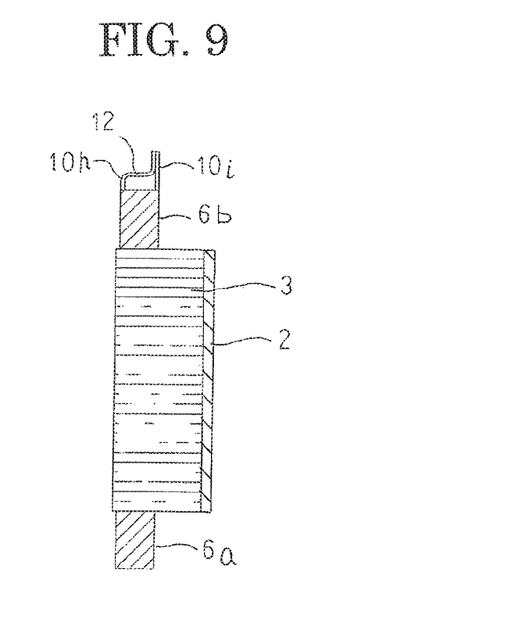
FIG. 9 is a partial cross section that explains joining of the winding bodies in the stator for a rotary electric machine according to Embodiment 1.
Figure 10:
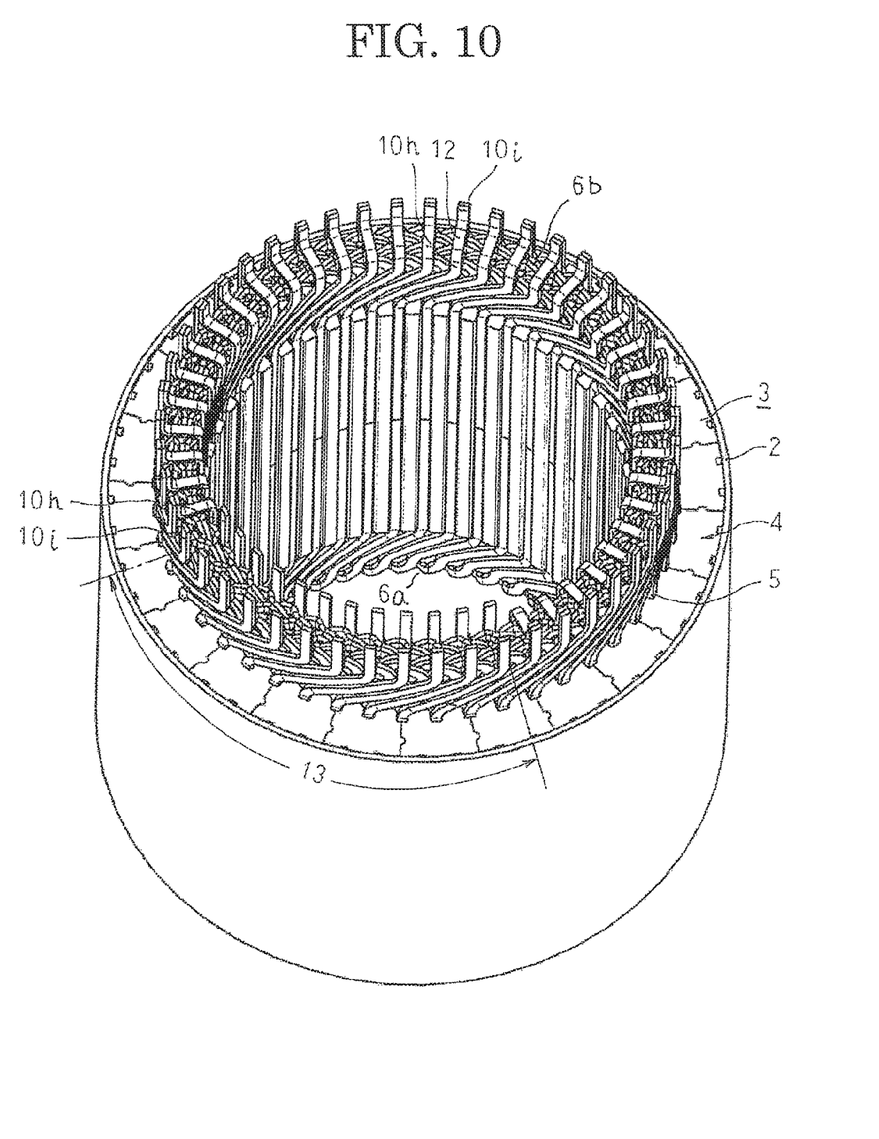
FIG. 10 is an oblique projection that shows a state in which the winding assembly that constitutes the stator winding is mounted to the stator core in the stator for a rotary electric machine according to Embodiment 1.
Figure 11:
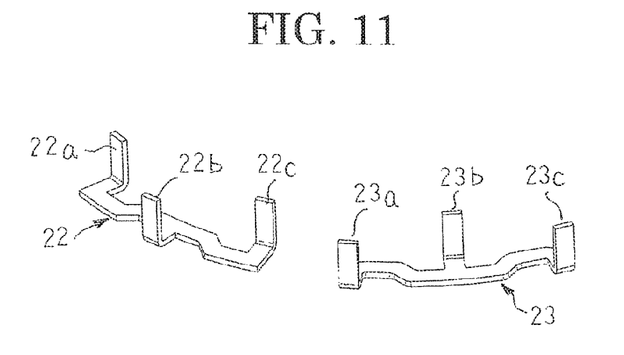
FIG. 11 is an oblique projection that shows first and second neutral point connecting busbars in the stator for a rotary electric machine according to Embodiment 1.
Figure 12:
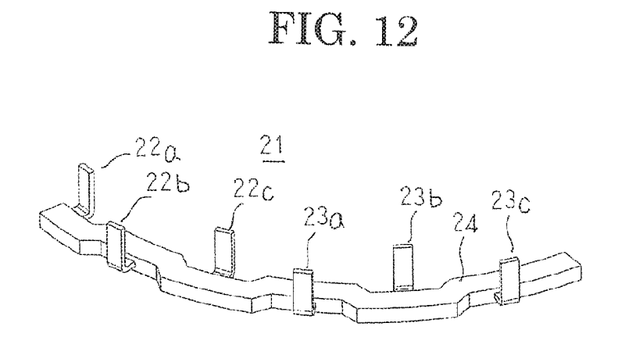
FIG. 12 is an oblique projection that shows a neutral point connecting plate in the stator for a rotary electric machine according to Embodiment 1.
Figure 13:
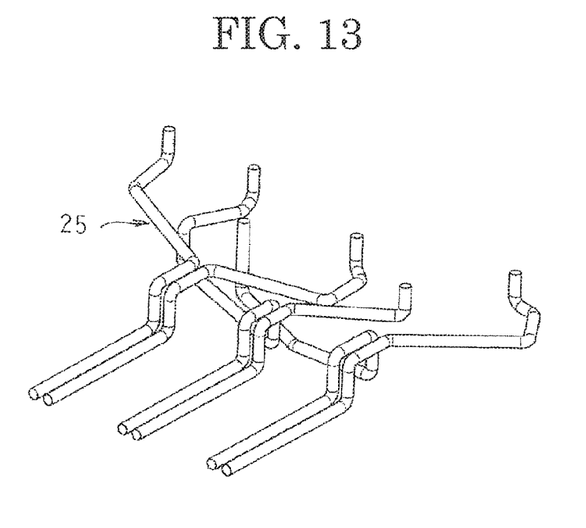
FIG. 13 is an oblique projection that shows electric power supplying coils in the stator for a rotary electric machine according to Embodiment 1.
Figure 14:
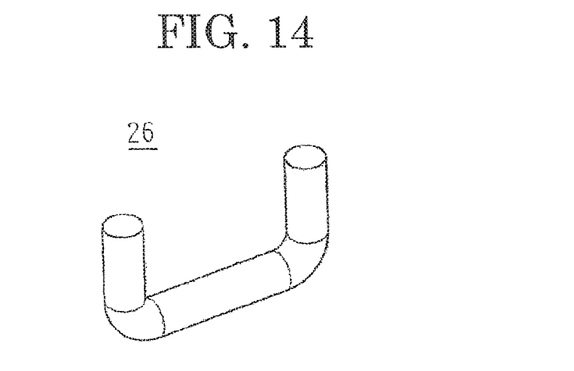
FIG. 14 is an oblique projection that shows a connecting coil in the stator for a rotary electric machine according to Embodiment 1.
Figure 15:
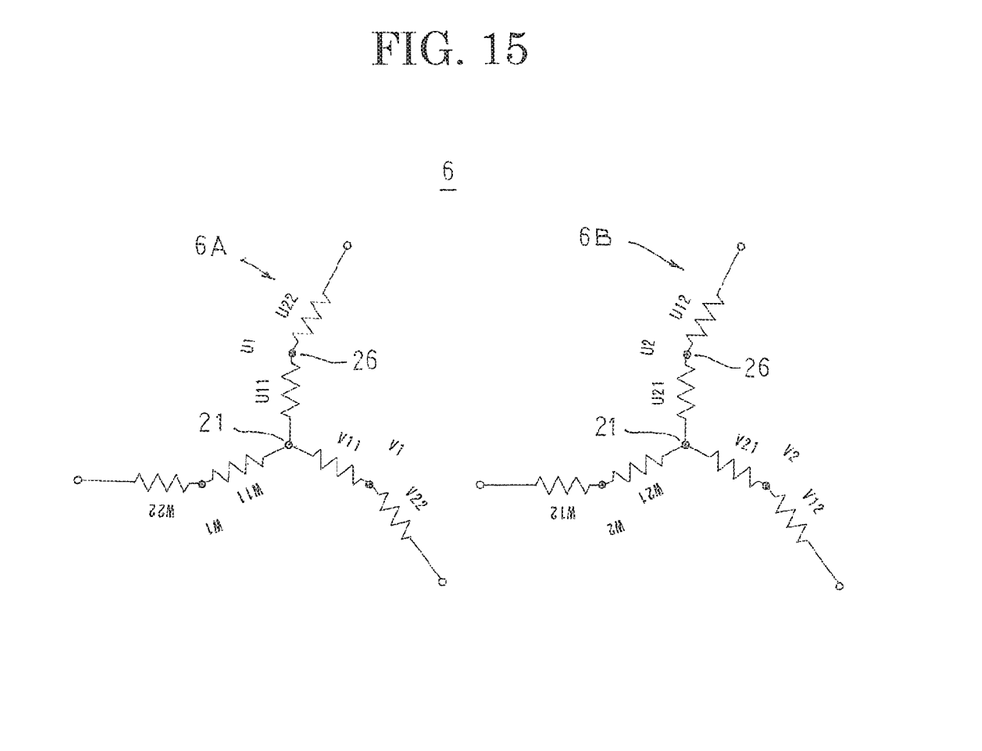
FIG. 15 shows connection diagrams for the stator winding in the stator for a rotary electric machine according to Embodiment 1.

FIG. 1 is an oblique projection that shows a stator for a rotary electric machine according to Embodiment 1 of the present invention, FIG. 2 is an oblique projection that shows a core block that constitutes part of a stator core in the stator for a rotary electric machine according to Embodiment 1, FIG. 3 is an oblique projection that shows a winding body that constitutes part of a stator winding in the stator for a rotary electric machine according to Embodiment 1, FIG. 4 is a front elevation that shows the winding body that constitutes part of the stator winding in the stator for a rotary electric machine according to Embodiment 1, FIG. 5 is an end elevation that shows the winding body that constitutes part of the stator winding in the stator for a rotary electric machine according to Embodiment 1 viewed from a side near second coil ends, FIG. 6 is a partial end elevation that shows a state in which three winding bodies that constitute part of the stator winding in the stator for a rotary electric machine according to Embodiment 1 are mounted into the stator core so as to share a single slot viewed from a side near second coil ends, FIG. 7 is a developed projection that shows a winding body that is mounted onto the stator core in the stator for a rotary electric machine according to Embodiment 1 viewed from radially outside, FIG. 8 is an oblique projection that shows a winding assembly that constitutes a stator winding in the stator for a rotary electric machine according to Embodiment 1, FIG. 9 is a partial cross section that explains joining of the winding bodies in the stator for a rotary electric machine according to Embodiment 1, FIG. 10 is an oblique projection that shows a state in which the winding assembly that constitutes the stator winding is mounted to the stator core in the stator for a rotary electric machine according to Embodiment 1, FIG. 11 is an oblique projection that shows first and second neutral point connecting busbars in the stator for a rotary electric machine according to Embodiment 1, FIG. 12 is an oblique projection that shows a neutral point connecting plate in the stator for a rotary electric machine according to Embodiment 1, FIG. 13 is an oblique projection that shows electric power supplying coils in the stator for a rotary electric machine according to Embodiment 1, FIG. 14 is an oblique projection that shows a connecting coil in the stator for a rotary electric machine according to Embodiment 1, and FIG. 15 shows connection diagrams for the stator winding in the stator for a rotary electric machine according to Embodiment 1.

In FIG. 1, a stator 1 is a stator for a rotary electric machine such as an electric motor or a generator, etc., and includes: an annular stator core 3; a stator winding 6 that is mounted onto the stator core 3; and connecting members 20 that connect the stator winding 6. Here, to facilitate explanation, the number of slots in the stator core 3 is forty-eight, and the stator winding is a three-phase winding. Furthermore, slots 5 are formed on the stator core 3 at a ratio of two slots per phase per pole.

As shown in FIG. 2, core blocks 4 are configured by dividing the annular stator core 3 into twenty-four equal sections circumferentially, are produced by laminating and integrating silicon steel sheets, and include: a core back portion 4a that has a circular arc-shaped cross section; and two teeth 4b that each project radially inward from an inner circumferential wall surface of the core back portion 12a so as to be separated in a circumferential direction. The stator core 3 is produced by arranging twenty-four core blocks 4 into an annular shape circumferentially by butting together circumferential side surfaces of the core back portion 4a such that the teeth 4b are oriented radially inward, and integrating them by shrink-fitting, press-fitting, etc., them into a cylindrical frame 2. The slots 5, which are formed by the core back portions 4a and the teeth 4b, are arranged at a uniform angular pitch circumferentially so as to be open on an inner circumferential side.

The stator winding 6 includes forty-eight winding bodies 10 that are disposed at a pitch of one slot circumferentially around the stator core 3.

The winding bodies 10 are distributed windings that are produced by winding into edgewise windings conductor wires 9 that are made of jointless continuous rectangular copper wire that is insulated using an enamel resin, for example. Specifically, as shown in 3 through 5, the winding bodies 10 are configured such that two δ-shaped coil patterns that are constituted by a first rectilinear portion 10a, a first coil end portion 10e, a second rectilinear portion 10b, a second coil end portion 10f, a third rectilinear portion 10c, a third coil end portion 10g, and a fourth rectilinear portion 10d are arranged in a longitudinal direction of short sides of rectangular cross sections of the conductor wires 9, and the fourth rectilinear portion 10d and the first rectilinear portion 10a are linked using a linking wire 11. The linking wires 11 constitute coil end portions, winding start end portions of the conductor wires 9 constitute winding ends 10h that function as first conductor terminals, and winding finish end portions constitute winding ends 10i that function as second conductor terminals.

In winding bodies 10 that are configured in this manner, four first rectilinear portions 10a and third rectilinear portions 10c are arranged in a single column such that longitudinal directions of long sides of the rectangular cross sections are oriented in a circumferential direction so as to leave gaps d in the longitudinal direction of the short sides of the rectangular cross sections. Two second rectilinear portions 10b are arranged so as to be separated by an angular pitch of six slots in a first circumferential direction from the column of the first rectilinear portions 10a and the third rectilinear portions 10c such that longitudinal directions of long sides of the rectangular cross sections are oriented in a circumferential direction so as to leave a gap 3d in the longitudinal direction of the short sides of the rectangular cross sections. Two fourth rectilinear portions 10d are arranged so as to be separated by an angular pitch of six slots in a second circumferential direction from the column of the first rectilinear portions 10a and the third rectilinear portions 10c such that longitudinal directions of long sides of the rectangular cross sections are oriented in a circumferential direction so as to leave a gap 3d in the longitudinal direction of the short sides of the rectangular cross sections. Moreover, an angular pitch of six slots is a pitch between slot centers of slots 5 on two sides of six consecutive teeth 4b, and corresponds to a pitch of one magnetic pole. Furthermore, d is a length of the short sides of the rectangular cross sections of the conductor wires 9.

FIG. 6 shows a state in which three winding bodies 10 are each mounted into the stator core 3 so as to share one slot 5. FIG. 7 shows the state in which the winding bodies 10 are mounted into the stator core when viewed from radially outside. In FIG. 6, three slots 5 that line up at an angular pitch of six slots circumferentially will be designated a first slot $5_1$, a second slot $5_2$, and a third slot $5_3$, in order circumferentially.

In FIGS. 6 and 7, focusing on one winding body 10, a first coil end portion 10e that extends outward at a second axial end from a first rectilinear portion 10a in a first layer from a slot opening side of the second slot $5_2$ (a radially innermost position) extends toward the first slot $5_1$ circumferentially at an angle of inclination θ, changes lanes (hereinafter "is shifted") radially outward at a vertex portion by a distance d, subsequently extends toward the first slot $5_1$ circumferentially at a reverse angle of inclination θ, and is linked to a second rectilinear portion 10b in a second layer from the slot opening side of the first slot $5_1$. Next, a second coil end portion 10f that extends outward at a first axial end from the second rectilinear portion 10b in the second layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a third rectilinear portion 10c in a third layer from the slot opening side of the second slot $5_2$.

Next, a third coil end portion 10g that extends outward at the second axial end from the third rectilinear portion 10c in the third layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in a fourth layer from the slot opening side of the third slot $5_3$.

Next, a linking portion 11 that extends outward at the first axial end from the fourth rectilinear portion 10d in the fourth layer from the slot opening side of the third slot $5_3$ extends toward the second slot $5_2$ circumferentially at an angle of inclination θ, is shifted radially outward at a vertex portion by a distance d, subsequently extends toward the second slot $5_2$ circumferentially at a reverse angle of inclination θ, and is linked to a first rectilinear portion 10a in a fifth layer from the slot opening side of the second slot $5_2$. A first coil end portion 10e that extends outward at the second axial end from the first rectilinear portion 10a in the fifth layer from the slot opening side of the second slot $5_2$ extends toward the first slot $5_1$ circumferentially at an angle of inclination θ, is shifted radially outward at a vertex portion by a distance d, subsequently extends toward the first slot $5_1$ circumferentially at a reverse angle of inclination θ, and is linked to a second rectilinear portion 10b in a sixth layer from the slot opening side of the first slot $5_1$.

Next, the second coil end portion 10f that extends outward at the first axial end from the second rectilinear portion 10b in the sixth layer from the slot opening side of the first slot $5_1$ extends toward the second slot $5_2$ circumferentially at an angle of inclination θ, is shifted radially outward at a vertex portion by a distance d, subsequently extends toward the second slot $5_2$ circumferentially at a reverse angle of inclination ∝, and is linked to a third rectilinear portion 10c in a seventh layer from the slot opening side of the second slot $5_2$. Next, a third coil end portion 10g that extends outward at the second axial end from the third rectilinear portion 10c in the seventh layer from the slot opening side of the second slot $5_2$ extends toward the third slot $5_3$ circumferentially at an angle of inclination θ, is shifted radially outward at a vertex portion by a distance d, subsequently extends toward the third slot $5_3$ circumferentially at a reverse angle of inclination θ, and is linked to a fourth rectilinear portion 10d in an eighth layer (a radially outermost position) from the slot opening side of the third slot $5_3$.

Thus, the first rectilinear portion 10a in the first layer of the second slot $5_2$ and the second rectilinear portion 10b in the second layer of the first slot $5_1$ are linked by the first coil end portion 10e, the second rectilinear portion 10b in the second layer of the first slot $5_1$ and the third rectilinear portion 10c in the third layer of the second slot $5_2$ are linked by the second coil end portion 10f, and the third rectilinear portion 10c in the third layer of the second slot $5_2$ and the fourth rectilinear portion 10d in the fourth layer of the third slot $5_3$ are linked by the third coil end portion 10g, to constitute a δ-shaped coil pattern.

In addition, the first rectilinear portion 10a in the fifth layer of the second slot $5_2$ and the second rectilinear portion 10b in the sixth layer of the first slot $5_1$ are linked by the first coil end portion 10e, the second rectilinear portion 10b in the sixth layer of the first slot $5_1$ and the third rectilinear portion 10c in the seventh layer of the second slot $5_2$ are linked by the second coil end portion 10f, and the third rectilinear portion 10c in the seventh layer of the second slot $5_2$ and the fourth rectilinear portion 10d in the eighth layer of the third slot 5₃ are linked by the third coil end portion 10g, to constitute a δ-shaped coil pattern.

Thus, a winding body 10 is configured by winding a conductor wire 9 into a first slot 5₁, a second slot 5₂, and a third slot 5₃ that line up at an angular pitch of six slots circumferentially, so as to repeat for two iterations in a radial direction a 6-shaped coil pattern that is formed by inserting the conductor wire 9 so as to alternate an axial direction of insertion into the first slot 5₁, the second slot 5₂, and the third slot 5₃, sequentially in order of the second slot 5₂, the first slot 5₁, the second slot 5₂, and the third slot 5₃.

The winding body 10 is configured by linking the two 6-shaped coil patterns using a linking wire 11 so as to be arranged into two layers in a radial direction. In other words, the winding body 10 is produced by winding the conductor wire 9 in such a way that the two 6-shaped coil patterns become continuous. The first through fourth rectilinear portions 10a, 10b, 10c, and 10d are housed in slots 5 that are shared by three winding bodies 10 such that the longitudinal directions of the long sides of the rectangular cross sections of the conductor wires 9 are oriented circumferentially so as to line up in single columns in a radial direction.

Forty-eight winding bodies 10 that are configured in this manner are arranged concentrically at a pitch of one slot to produce the winding assembly 7 that is shown in FIG. 8. At a second axial end of the winding assembly 7, a layer of first coil end portions 10e in which the first coil end portions 10e are arranged circumferentially at a pitch of one slot and a layer of third coil end portions 10g in which the third coil end portions 10g are arranged circumferentially at a pitch of one slot are arranged alternately in four layers in a radial direction to constitute first coil ends 6a. At a first axial end of the winding assembly 7, a layer of second coil end portions 10f in which the second coil end portions 10f are arranged circumferentially at a pitch of one slot and a layer of linking wires 11 in which the linking wires 11 are arranged circumferentially at a pitch of one slot are arranged alternately in three layers in a radial direction to constitute second coil ends 6b. End portions of the winding ends 10h each extend axially outward from a radially inner side of the second coil ends 6b, and are arranged circumferentially at a pitch of one slot, and end portions of the winding ends 10i each extend axially outward from a radially outer side of the second coil ends 6b, and are arranged circumferentially at a pitch of one slot.

Shapes of the winding ends 10h and 10i of the winding bodies 10 will now be explained using FIGS. 3 through 6. The winding ends 10h that extend outward near the second coil ends 6b from the first rectilinear portions 10a in the first layer of the second slots 5₂ are formed so as to extend toward the first slots 5₁ circumferentially at an angle of inclination θ and be bent at vertex portions (intermediate positions between the first slots 5₁ and the second slots 5₂) to extend axially outward. The winding ends 10i that extend outward near the second coil ends 6b from the fourth rectilinear portions 10d in the eighth layer of the third slots 5₃ are formed so as to extend toward the fourth slots 5₄ circumferentially at an angle of inclination θ and be bent at vertex portions (intermediate positions between the third slots 5₃ and the fourth slots 5₄) to extend axially outward.

Thus, the circumferential positions of the end portions of the winding ends 10i that protrude axially outward from the winding bodies 10 in which the first rectilinear portions 10a are housed in the second slots 5₂ align approximately with the circumferential positions of the end portions of the winding ends 10h that protrude axially outward from the winding bodies 10 in which the first rectilinear portions 10a are housed in the fourth slots 5₄. In other words, the circumferential positions of the end portions that protrude axially outward from the winding ends 10i of first winding bodies 10 align approximately with the circumferential positions of the end portions that protrude axially outward from the winding ends 10h of second winding bodies 10 that are two pole pitches away.

Next, a connection method for the winding assembly 7 will be explained by allotting, for convenience, Slot Numbers 1, 2, etc., through 48 in circumferential order to the forty-eight slots 5 that are disposed circumferentially around the stator core 3.

Eight winding bodies 10 are first mounted into a slot group at Slot Numbers (1+6n), where n is a natural number that is greater than or equal to 0 and less than or equal to 7. Then, four winding bodies 10 that are arranged at a pitch of two magnetic poles among the eight winding bodies 10 are respectively connected in series to form small coil groups U11 and U12.

Next, eight winding bodies 10 are mounted into a slot group at Slot Numbers (2+6n). Then, four winding bodies 10 that are arranged at a pitch of two magnetic poles among the eight winding bodies 10 are respectively connected in series to form small coil groups U21 and U22.

Eight winding bodies 10 are mounted into a slot group at Slot Numbers (3+6n). Then, four winding bodies 10 that are arranged at a pitch of two magnetic poles among the eight winding bodies 10 are respectively connected in series to form small coil groups V11 and V12.

Next, eight winding bodies 10 are mounted into a slot group at Slot Numbers (4+6n). Then, four winding bodies 10 that are arranged at a pitch of two magnetic poles among the eight winding bodies 10 are respectively connected in series to form small coil groups V21 and V22.

Eight winding bodies 10 are mounted into a slot group at Slot Numbers (5+6n). Then, four winding bodies 10 that are arranged at a pitch of two magnetic poles among the eight winding bodies 10 are respectively connected in series to form small coil groups W11 and W12.

Next, eight winding bodies 10 are mounted into a slot group at Slot Numbers (6+6n). Then, four winding bodies 10 that are arranged at a pitch of two magnetic poles among the eight winding bodies 10 are respectively connected in series to form small coil groups W21 and W22.

Here, as shown in FIG. 9, crossover portions 12 are formed by bending each of the winding ends 10h radially outward near end portions thereof. These crossover portions 12 are led radially outward so as to pass axially outside the second coil ends 6b, and are joined to the end portions of the winding ends 10i that are positioned radially outside the winding ends 10h in question by TIG welding, etc. Twelve small coil groups U11, U12, U21, U22, V11, V12, V21, V22, W11, W12, W21, and W22 that are each configured by connecting in series four winding bodies 10 that are arranged at a pitch of two magnetic poles circumferentially around the stator core 3 are produced thereby.

Moreover, from a viewpoint of suppressing the occurrence of damage to insulating coatings on the conductor wires 9 when the winding ends 10h are bent in order to form the crossover portions 12, it is desirable to make a bending radius of the winding ends 10h greater than a thickness of the winding ends 10h in the direction of bending, i.e., the wire thickness d.

As shown in FIG. 10, the end portions of the winding ends 10h, which constitute first ends of the twelve small coil groups U11, U12, U21, U22, V11, V12, V21, V22, W11, W12, W21, and W22, are arranged at a pitch of one slot circumferentially around a radially inner side of a circular arc-shaped region 13 that extends in a circular arc shape circumferentially around the second coil ends 6b, and the end portions of the winding ends 10i, which constitute second ends, are arranged at a pitch of one slot circumferentially around a radially outer side of the circular arc-shaped region 13 of the second coil ends 6b. End portion regions of the winding ends 10h that are led radially outward so as to pass axially outside the second coil ends 6b (hereinafter "the crossover portions 12") are arranged at a pitch of one slot circumferentially around a C-shaped region that is positioned on opposite sides of the circular arc-shaped region 13 on which the end portions of the winding ends 10h and 10i of the twelve small coil groups U11, U12, U21, U22, V11, V12, V21, V22, W11, W12, W21, and W22 are arranged circumferentially.

Connection of the twelve small coil groups U11, U12, U21, U22, V11, V12, V21, V22, W11, W12, W21, and W22 is performed using the connecting members 20 in the circular arc-shaped region 13 in which the end portions of the winding ends 10h and 10i of the twelve small coil groups U11, U12, U21, U22, V11, V12, V21, V22, W11, W12, W21, and W22 are arranged circumferentially.

The connecting members 20 include: a neutral point connecting plate 21; electric power supplying coils 25 that are connected to electric power supplying portions of the stator winding 6 for supplying electric power to the stator winding 6 from an external electric power supply; and connecting coils 26 that connect between similar or identical phase small coil groups. First and second neutral point connecting busbars 22 and 23 are produced by applying punching and bending to steel sheets, as shown in FIG. 11. As shown in FIG. 12, the neutral point connecting plate 21 is produced by insert-molding the first and second neutral point connecting busbars 22 and 23 using an insulating resin 24. As shown in FIG. 13, the electric power supplying coils 25 are produced by bending and shaping conducting wires. As shown in FIG. 14, the connecting coils 26 are produced by bending and shaping conducting wires into an angular C shape.

A connecting coil 26 links the winding ends 10h and 10i that are end portions of the small coil groups U11 and U22, which are offset by 30 electrical degrees, to produce a U1-phase winding in which the small coil groups U11 and U22 are connected in series. A connecting coil 26 links the winding ends 10h and 10i that are end portions of the small coil groups V11 and V22, which are offset by 30 electrical degrees, to produce a V1-phase winding in which the small coil groups V11 and V22 are connected in series. A connecting coil 26 links the winding ends 10h and 10i that are end portions of the small coil groups W11 and W22, which are offset by 30 electrical degrees, to produce a W1-phase winding in which the small coil groups W11 and W22 are connected in series.

A connecting coil 26 links the winding ends 10h and 10i that are end portions of the small coil groups U21 and U12, which are offset by 30 electrical degrees, to produce a U2-phase winding in which the small coil groups U21 and U12 are connected in series. A connecting coil 26 links the winding ends 10h and 10i that are end portions of the small coil groups V21 and V12, which are offset by 30 electrical degrees, to produce a V2-phase winding in which the small coil groups V21 and V12 are connected in series. A connecting coil 26 links the winding ends 10h and 10i that are end portions of the small coil groups W21 and W12, which are offset by 30 electrical degrees, to produce a W2-phase winding in which the small coil groups W21 and W12 are connected in series.

The neutral point connecting plate 21 is disposed above the second coil ends 6b, and the terminals 22a, 22b, and 22c of the first neutral point connecting busbar 22 are joined to the winding ends 10h and 10i of the small coil groups U12, V12, and W12. In addition, the terminals 23a, 23b, and 23c of the second neutral point connecting busbar 23 are joined to the winding ends 10h and 10i of the small coil groups U22, V22, and W22. As shown in FIG. 15, a first three-phase alternating-current winding 6A that is configured by wye-connecting the U1-phase winding, the V1-phase winding, and the W1-phase winding and a second three-phase alternating-current winding 6B that is configured by wye-connecting the U2-phase winding, the V2-phase winding, and the W2-phase winding are formed thereby. In addition, the electric power supplying coils 25 are connected to the power supplying terminals of the first and second three-phase alternating-current windings 6A and 6B.

According to Embodiment 1, a stator winding 6 is configured by mounting distributed winding bodies 10 to a stator core 3 circumferentially at a pitch of one slot so as to be equal in number to a total number of slots 5, the distributed winding bodies 10 each being produced by winding jointless continuous conductor wire 9 that is coated with insulation. The winding bodies 10 are configured such that winding ends 10h extend outward at a first axial end of the stator core 3 from radially innermost positions inside the slots 5, and winding ends 10i extend outward at the first axial end of the stator core 3 from radially outermost positions inside the slots 5. Twelve small coil groups U11, U12, U21, U22, V11, V12, V21, V22, W11, W12, W21, and W22 are configured such that four winding bodies 10 are connected in series by joining to the winding ends 10i that are subject to joining axially outside second coil ends 6b crossover portions 12 that are each formed by bending the winding ends 10h radially outward. The winding ends 10h of the small coil groups U11, U12, U21, U22, V11, V12, V21, V22, W11, W12, W21, and W22 are disposed so as to be separated from each other circumferentially around a radially inner side of a circular arc-shaped region 13 that extends circumferentially around the second coil ends 6b, the winding ends 10i of the small coil groups U11, U12, U21, U22, V11, V12, V21, V22, W11, W12, W21, and W22 are disposed so as to be separated from each other circumferentially around a radially outer side of the circular arc-shaped region 13 of the second coil ends 6b, and the crossover portions 12 are disposed in a C shape that spans the circular arc-shaped region 13 so as to be spaced apart from each other circumferentially axially outside the second coil ends 6b.

The small coil groups U11, U12, U21, U22, V11, V12, V21, V22, W11, W12, W21, and W22 are AC-connected within the circular arc-shaped region 13 using connecting members 20 that include a neutral point connecting plate 21, electric power supplying coils 25, and connecting coils 26, to produce the stator winding 6.

Thus, because the small coil groups U11, U12, U21, U22, V11, V12, V21, V22, W11, W12, W21, and W22 are AC-connected within the circular arc-shaped region 13, in which crossover portions 12 are not present, axial height of the AC connecting wire portions from the second coil ends 6b due to the connecting members 20 is reduced, enabling the axial length of the stator 1 to be shortened.

The AC connecting wire portions are close to the end surface of the stator core 3, improving the vibration resistance of the neutral point connecting plate 21, the electric power supplying coils 25, and the connecting coils 26.

Because the connecting coils 26 and the neutral point connecting plate 21 are disposed within a radial region between the winding ends 10h and 10i of the small coil groups U11, U12, U21, U22, V11, V12, V21, V22, W11, W12, W21, and W22 and are connected to the winding ends 10h and 10i that are subject to connection, parts other than the electric power supplying coils 25 will not protrude radially outward from the coil ends, making interference with peripheral parts of the rotary electric machine less likely, and improving mountability.

Because the phase windings are configured by connecting together small coil groups that are offset by 30 electrical degrees using the connecting coils 26, the winding ends 10h and 10i that are connected by the connecting coils 26 are circumferentially adjacent. Thus, connecting work is facilitated, and overlapping of connecting coils 26 within the circular arc-shaped region 13 and overlapping between the electric power supplying coils 25 and the connecting coils 26 are also kept to a minimum, enabling the axial height of the AC connecting wire portions from the second coil ends 6b due to the connecting members 20 to be reduced.

Moreover, in Embodiment 1, the winding bodies are produced using conductor wire that has a rectangular cross section, but the cross section of the conductor wire that constitutes the winding bodies is not limited to a rectangular shape, and conductor wire that has a circular cross section may be used, for example.

In Embodiment 1, a first three-phase alternating-current winding is configured by wye-connecting the U1-phase winding, the V1-phase winding, and the W1-phase winding, and a second three-phase alternating-current winding is configured by wye-connecting the U2-phase winding, the V2-phase winding, and the W2-phase winding, but a first three-phase alternating-current winding may be configured by delta-connecting the U1-phase winding, the V1-phase winding, and the W1-phase winding, and a second three-phase alternating-current winding configured by delta-connecting the U2-phase winding, the V2-phase winding, and the W2-phase winding.

In Embodiment 1, a U1-phase winding, a V1-phase winding, a W1-phase winding, a U2-phase winding, a V2-phase winding, and a W2-phase winding are each configured by connecting small coil groups in series, but a U1-phase winding, a V1-phase winding, a W1-phase winding, a U2-phase winding, a V2-phase winding, and a W2-phase winding may each be configured by connecting small coil groups in parallel.

In Embodiment 1, a stator core on which forty-eight slots are disposed is used, but the total number of slots is not limited to forty-eight. Furthermore, the slots are formed at a ratio of two slots per phase per pole, but the number of slots per phase per pole is not limited to two, and may be one, or may be three or greater. In Embodiment 1, the number of slots per phase per pole was two, and the spacing between the slots into which the rectilinear portions of the winding bodies are inserted was an angular pitch of six slots (a pitch of one magnetic pole), but if the number of slots per phase per pole is one, spacing between the slots into which the rectilinear portions of the winding bodies are inserted is an angular pitch of three slots (a pitch of one magnetic pole).

In Embodiment 1, the winding bodies are constituted by full-pitch windings, but the winding bodies may be constituted by short-pitch windings or long-pitch windings.

In Embodiment 1, winding bodies have been used in which two 6-shaped coil patterns that are arranged radially are formed continuously, but winding bodies may be formed using one 6-shaped coil pattern, or may be formed using three or more 6-shaped coil patterns that are arranged radially.

In Embodiment 1, winding bodies have been used in which two 6-shaped coil patterns that are arranged radially are formed continuously, but the winding bodies are not limited to winding bodies in which two 6-shaped coil patterns that are arranged radially are formed continuously, provided that distributed winding bodies are disposed at a pitch of one slot so as to be equal in number to the number of slots in the stator core, and the winding start end portions of each of the winding bodies protrude axially outward from radially inside second coil ends, and winding finish end portions protrude axially outward from radially outside the second coil ends. For example, winding bodies may be used that are formed into a "hexagonal" coil pattern in which a conductor wire is wound helically for a plurality of turns.

The invention claimed is:

1. A stator for a rotary electric machine comprising:
    an annular stator core in which slots are arranged circumferentially; and
    a stator winding that is mounted to said stator core, wherein: said stator winding is configured by mounting distributed winding bodies to said stator core circumferentially at a pitch of one slot so as to be equal in number to a total number of said slots, said distributed winding bodies each being produced by winding for a plurality of turns a jointless continuous conductor wire that is coated with insulation;
    said winding bodies are configured such that a first conductor terminal of said conductor wire extends outward at a first axial end of said stator core from a radially innermost position inside said slots, and a second conductor terminal of said conductor wire extends outward at said first axial end of said stator core from a radially outermost position inside said slots;
    a plurality of coil groups are each configured by connecting a plurality of said winding bodies in series by passing crossover portions that are formed by bending said first conductor terminals radially outward axially outside a coil end at said first axial end of said stator winding and joining said crossover portions to said second conductor terminals that are subject to joining;
    said first conductor terminals that constitute first ends of said coil group are disposed so as to be spaced apart from each other circumferentially around a radially inner side of a circular arc-shaped region that extends circumferentially around said coil end, said second conductor terminals that constitute second ends of said coil group are arranged so as to be spaced apart from each other circumferentially around a radially outer side of said circular arc-shaped region of said coil end, and said crossover portions are disposed in a C shape that spans said circular arc-shaped region so as to be spaced apart from each other circumferentially axially outside said coil end; and
    said stator winding is produced by connecting said plurality of coil groups within said circular arc-shaped region.

2. The stator for a rotary electric machine according to claim 1, wherein members that connect said plurality of coil groups, except for electric power supplying coils that supply electric power from outside, are disposed on said coil end within a radial region between said first conductor terminals and said second conductor terminals within said circular arc-shaped region.

3. The stator for a rotary electric machine according to claim 1, wherein said winding bodies are configured by winding a δ-shaped coil pattern repeatedly for m turns in a radial direction, where m is a natural number that is greater than or equal to 1, said δ-shaped coil pattern being formed by inserting said conductor wire into a first slot, a second slot, and a third slot that line up at an angular spacing of n slots in a circumferential direction, where n is an integer that is greater than or equal to 2, in order of said second slot, said first slot, said second slot, and said third slot, so as to alternate an axial direction of insertion into said first slot, said second slot, and said third slot.

4. The stator for a rotary electric machine according to claim 1, wherein a bending radius of said first conductor terminals is greater than a thickness of said first conductor terminals in a direction of bending.

\* \* \* \* \*